March 7, 1939.  R. E. BRIGGS  2,149,723
TAKE-UP MECHANISM
Filed Dec. 29, 1936   2 Sheets-Sheet 1
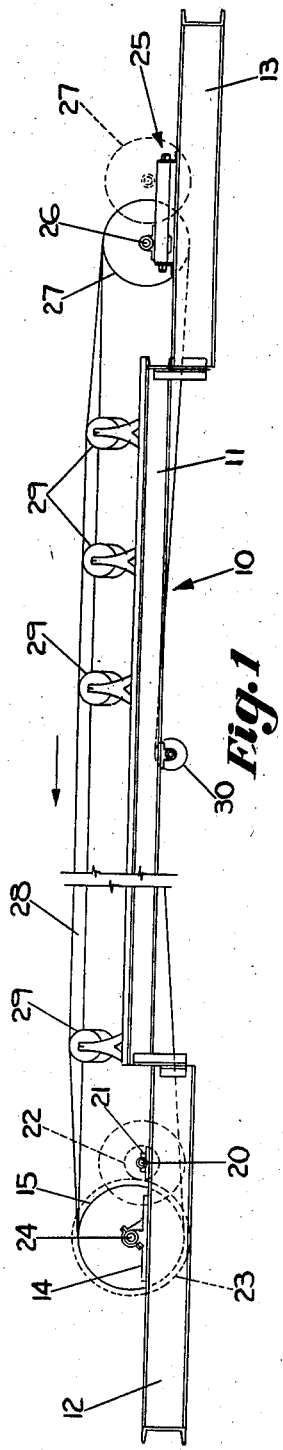
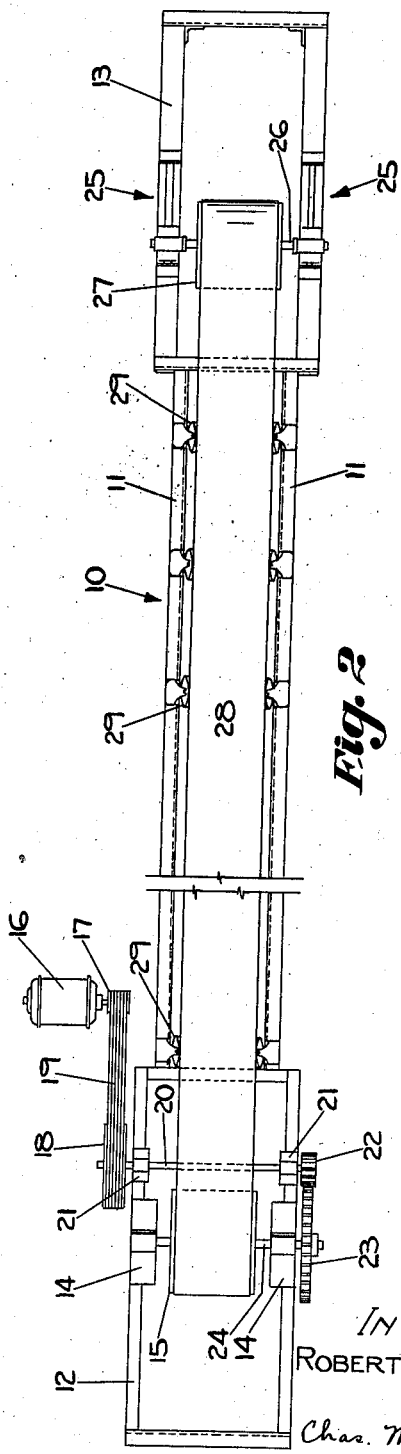
INVENTOR.
ROBERT E. BRIGGS,
BY
Chas. M. Nissen,
ATTY.

March 7, 1939. R. E. BRIGGS 2,149,723
TAKE-UP MECHANISM
Filed Dec. 29, 1936 2 Sheets-Sheet 2
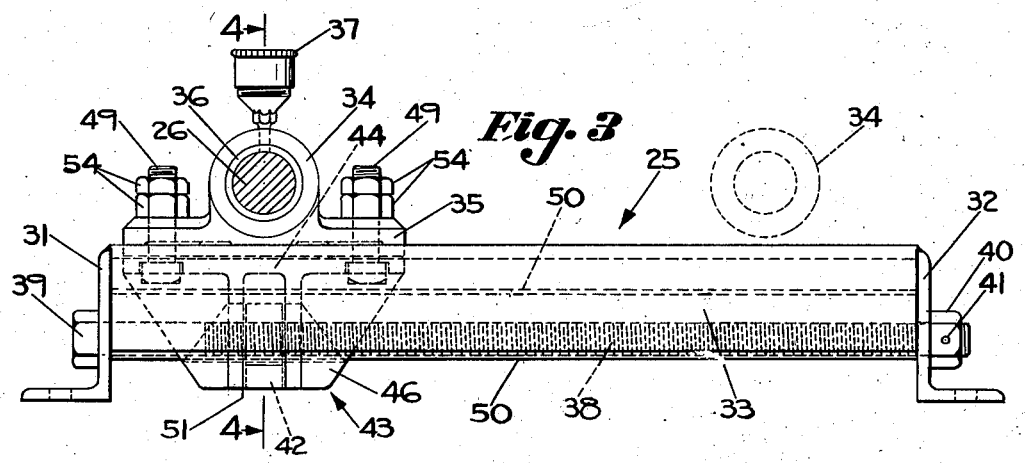
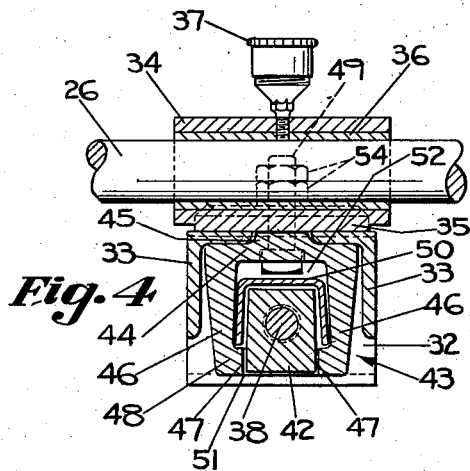
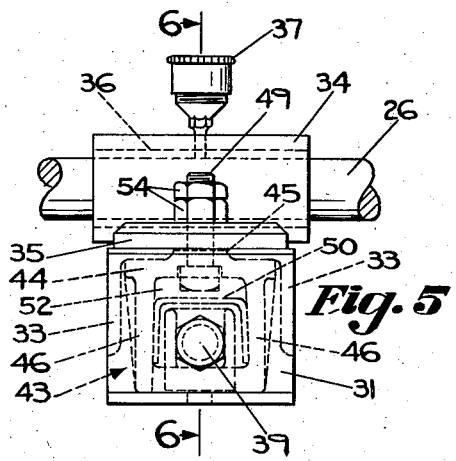
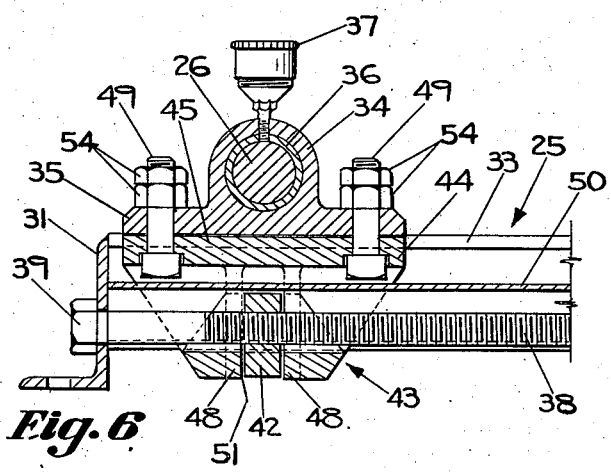
INVENTOR:
ROBERT E. BRIGGS,
BY
Chas. M. Nissen,
ATTY.

Patented Mar. 7, 1939

2,149,723

UNITED STATES PATENT OFFICE 2,149,723

TAKE-UP MECHANISM

Robert E. Briggs, Columbus, Ohio, assignor to The Jeffrey Manufacturing Company, a corporation of Ohio Application December 29, 1936, Serial No. 118,068

9 Claims. (Cl. 308—59)

This invention relates to a take-up mechanism particularly useful in connection with a belt conveyor to adjust the tension of the belt thereof though its use is not so restricted.

An object of the invention is to provide a conveyor including the take-up mechanism, and to provide a take-up mechanism alone, in which said take-up mechanism is provided with means to protect the take-up screw thereof.

Another object of the invention is to provide a take-up mechanism of simplified but very rugged construction which may be adjusted to a plurality of positions and readily clamped in any adjusted position.

Other objects of the invention will appear hereinafter, the novel features and combinations being set forth in the appended claims.

In the accompanying drawings,

Fig. 1 is a side elevational view of a conveyor comprising my invention;

Fig. 2 is a plan view of the device of Fig. 1;

Fig. 3 is an enlarged side elevational view of the take-up mechanism comprising my invention;

Fig. 4 is a sectional elevational view taken on the line 4—4 of Fig. 3 looking in the direction of the arrows;

Fig. 5 is an end view of the device of Fig. 3; and

Fig. 6 is a longitudinal sectional view taken on the line 6—6 of Fig. 5 looking in the direction of the arrows.

As best seen in Figs. 1 and 2 of the drawings, the conveyor comprising my invention includes a main frame 10 formed by a pair of longitudinal extending channel members 11, 11 rigidly attached to a forward pulley supporting frame 12 and a rearward pulley supporting frame 13 each formed by a plurality of rigidly attached channel members formed as a rectangle.

The forward frame 12 is provided with a pair of journal bearings 14, 14 which support a head pulley 15 driven from a motor 16 through an appropriate drive comprising V-pulleys 17 and 18, V-belts 19, shaft 20 mounted on frame 12 by journal bearings 21, 21 and intermeshing gears 22 and 23 carried by shafts 20 and 24, respectively, the latter of which comprises the shaft for head pulley 15.

The rear supporting frame 13 supports a pair of take-up mechanisms 25, 25, the detailed structure of which is shown in Figs. 3 to 6 of the drawings and described in detail hereinafter. Said take-up mechanisms 25, 25 support the shaft 26 of a tail pulley 27. Extending between the head pulley 15 and the tail pulley 27 is a continuous conveyor belt 28, the upper run of which is supported from channel members 11, 11 by idler rollers 29, and the lower run of which is supported by idler rollers 30.

As clearly illustrated at the right of Fig. 1 of the drawings, the take-up mechanisms 25, 25 provide for an adjustment of the position of the tail pulley 27 thereby to provide for a tensioning of the belt 28. Said take-up mechanisms 25, 25 are individually adjustable thereby providing for proper alignment of the shaft 26 should it tend to become improperly aligned.

Attention is now directed particularly to Figs. 3 to 6 of the drawings and to the specific construction of the take-up mechanisms 25, 25, it being understood that said take-up mechanisms are of similar construction. A pair of end members in the form of angle clips 31 and 32 are rigidly attached together at their tops by a pair of spaced longitudinally extending angle members 33, 33, the ends of which are welded to said angle clips 31 and 32.

The angle members 33, 33 provide a support for a journal box 34 provided with a bottom bearing plate 35 adapted to slide longitudinally along the top webs of said angle members 33, 33. The journal box 34 is provided with an appropriate bearing shown in the form of a journal bearing 36 and supporting the shaft 26 of the tail pulley 27. A grease cup 37 is provided to lubricate the journal bearing 36.

Extending longitudinally between the angle members 31 and 32 is a threaded shaft 38 provided with a head 39 and a nut 40 to prevent axial movement thereof with respect to said end members 31 and 32. The nut 40 will be held against rotation with respect to the shaft 38 by a pin 41. Said shaft 38 is mounted for free rotation in the end members 31 and 32 which rotation may be transmitted thereto by applying an appropriate wrench to the head 39.

Threaded on the shaft 38 is a nut 42 the function of which is to adjust the bearing box 34 along the support and guide-way formed by the angle members 33 and thus to adjust the tension of the belt 28. The bearing box 34 may be adjusted from the full line position illustrated in Fig. 3 of the drawings to the dotted line position there illustrated, which will provide for the adjustment of the tail pulley 27 from the full line position illustrated in Fig. 1 to the dotted line position there illustrated.

To transmit the longitudinal movement of the nut 42 to the journal box 34 and also to cooperate with the bearing plate 35 to effect a clamping of said journal box 34 in any selected position of adjustment, I provide a casting 43. Said casting 43 has a protector encircling opening 52 formed by a top plate 44, a pair of spaced integral side plates 46, 46 which are spaced apart from the nut 42 to permit the protector 50 to thread therebetween, and a bottom plate 48. The bottom plate 48 has an opening 51 providing inwardly extending abutments 47, 47 adapted to contact the opposing sidewalls of the nut 42 to hold it against rotation.

The top plate 44 has a neck 45 which extends upwardly between the opposed edges of the horizontal webs of the angle member 33 and guides the journal box along the support formed by said angle members 33.

The opening 51 also provides a pair of longitudinally spaced webs, one positioned forwardly and the other rearwardly of the nut 42 thereby to insure longitudinal movement of the casting 43 with the nut 42.

Extending upwardly through the neck 45 of the casting 43 is a pair of bolts 49, 49 provided with appropriate nuts 54, 54.

Extending longitudinally of the take-up mechanism 25 and in frictional contact at its ends with the end members 31 and 32, I provide an inverted U-shaped protector 50 to protect the threaded shaft 38 particularly against water, dirt and grease. It is to be particularly noted that the protector 50 affords a very complete protection for the shaft 38 in that it is positioned very close to said shaft 38 and particularly in that the side walls thereof extend downwardly to positions below the bottom-most position of the shaft 38. As a consequence the shaft 38 is not only protected from downwardly falling material but is protected from any laterally moving material, the shaft 38 being exposed only from the bottom. This particular protector 50 therefore provides a very thorough and efficient protection for the shaft 38.

It is also to be noted that the protector 50 is not a load supporting member at all, and that it can be readily removed once the shaft 38 is removed which will permit the protector to be unthreaded from the casting 43. It is also to be noted, however, that with the shaft 38 in position the protector 50 will be held in proper position due to its threaded relation with the casting 43.

In the operation of the device to effect an adjustment of the shaft 26, the nuts 54, 54 will be loosened on the bolts 49 to permit free sliding of the bearing plate 35 along the support afforded by the top webs of the angle members 33. A wrench applied to the head 39 of the shaft 38 rotates it in any desired direction. Any rotation of the shaft 38 produces longitudinal movement of the nut 42 therealong as it is held against rotation by the abutments 47 of casting 43. This longitudinal movement of the nut 42 is transmitted to the casting 43 by virtue of the contacting bottom plate 48, which movement, in turn, is transferred to the journal box 34 by virtue of the bolts 49. After the journal box 34 has been adjusted to any desired position, during which the neck 45 will guide said journal box 34 longitudinally along the angle members 33, the nuts 54, 54 may be tightened to clamp said journal box 34 in position by effecting a clamping action on the angle members 33 between the bearing plate 35 and the top plate 44 of the casting 43.

During this adjustment the casting 43 readily slides along the stationary protector 50 which is passed loosely through openings 52 thereof, and holds said protector 50 in proper position to protect the threaded shaft 38. Should the friction between the ends of protector 50 and angle clips 31, 32 be insufficient to hold it in the position illustrated in Fig. 3, said protector may drop at one end on shaft 38, which is without objection, but it cannot fall out of protecting position due to its threaded relation through opening 52 of casting 43.

While the take-up mechanism has been particularly described in combination with a belt conveyor with which it is particularly adapted to be used, it is to be understood that said take-up mechanism has a general application.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A take-up mechanism comprising spaced end members, supporting means connecting said members together, a bearing box slidable along said supporting means, a threaded shaft supported by said end members and freely rotatable with respect thereto, a nut threaded on said shaft, a connecting member connected to said box and having side plates on opposite sides of said nut and end plates on opposite ends of said nut whereby said nut is held against rotation and insures movement of said member with said nut when said shaft is turned, and an inverted channel protector for said shaft extending longitudinally between said end members and passing between the side plates of said connecting member and said nut.

2. A take-up mechanism comprising a pair of end members, a bearing box, a pair of laterally spaced angle members attached at their ends to said end members and forming a support over which said box can slide, means for adjusting said box along said support, and means for clamping said box in adjusted position including means positioned between said angle members and connected to said box by an extension extending between said angle members.

3. In a device of the class described, the combination with a pair of end members, of a supporting guide track connected at its ends to said end members, a movable member supported by said track for movement therealong including a portion extending below said track, a threaded shaft below said track and mounted for rotation in said end members, and a cover for said shaft positioned between said supporting guide and said shaft.

4. In a device of the class described, the combination with a pair of end members, guide and supporting means comprising parallell spaced apart members connected at their ends to said end members, a movable member supported by said spaced apart members and having a portion extending between them, a screw shaft mounted for rotation in said end members, means restricting longitudinal movement of said screw shaft, cooperating means between said movable member and screw shaft to move said movable member longitudinally upon rotation of said screw shaft, and a protector for said screw shaft extending between said end members and positioned above said shaft and below said guide and supporting means.

5. In a device of the class described, the combination with a pair of end members, of a threaded shaft extending between said members and mounted for rotation with respect thereto, means holding said shaft against longitudinal movement, a support extending between said end members, a movable member mounted to move along and be supported by said support, said member including means having threaded relation with said shaft whereby rotation of said shaft will produce longitudinal movement of said movable member, and a protector which passes through an opening in said movable member which with said shaft holds it in shaft protecting position.

6. In a device of the class described, the combination with a screw shaft, of a support, means including a member threaded on said shaft and movable longitudinally along said support upon rotation of said shaft, and a removable protector for said shaft threaded through an opening in said means by which it is held in protecting relation with respect to said shaft.

7. A take-up mechanism comprising end members, a pair of laterally spaced longitudinally extending supporting members attached at their ends to said end members, a bearing box adapted to slide along and be supported by said supporting members, means for adjusting said bearing box along said supporting members, and means for releasably clamping said bearing box to said supporting members comprising means extending between said supporting members.

8. A take-up mechanism comprising end members, a pair of laterally spaced longitudinally extending supporting members formed by angle members with horizontal and downwardly extending flanges and attached at opposite ends to said end members, a threaded shaft extending between said end members and freely rotatable relative thereto, a bearing box mounted for sliding movement along said supporting members, means for releasably clamping said bearing box to said supporting members and cooperating with said threaded shaft to adjust it therealong including a member extending between said supporting members, and a protecting cover for said shaft extending between said end members and through said clamping means and positioned between said shaft and said supporting members.

9. A take-up mechanism comprising end members, a pair of laterally spaced longitudinally extending supporting members attached at opposite ends to said end members, a threaded shaft extending between said end members and freely rotatable relative thereto, a bearing box mounted for sliding movement along said supporting members, means for releasably clamping said bearing box to said supporting members and cooperating with said threaded shaft to adjust it therealong including a member extending between said supporting members, and a protecting cover for said shaft extending between said end members and through said clamping means and positioned between said shaft and said supporting members.

ROBERT E. BRIGGS.